United States Patent
Tang

(10) Patent No.: US 9,934,814 B2
(45) Date of Patent: Apr. 3, 2018

(54) MITIGATION OF LASER POWER VARIATION INDUCED PHASE SHIFT IN HEAT ASSISTED MAGNETIC RECORDING SYSTEMS

(71) Applicant: HGST Netherlands B.V., Amsterdam (NL)

(72) Inventor: Yaw-Shing Tang, Saratoga, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/083,135

(22) Filed: Mar. 28, 2016

(65) Prior Publication Data

US 2017/0278538 A1   Sep. 28, 2017

(51) Int. Cl.
*G11B 5/02* (2006.01)
*G11B 20/10* (2006.01)
*G11B 5/00* (2006.01)
*G11B 5/012* (2006.01)
*G11B 5/455* (2006.01)
*G11B 5/60* (2006.01)

(52) U.S. Cl.
CPC .......... *G11B 20/10222* (2013.01); *G11B 5/02* (2013.01); *G11B 20/10009* (2013.01); *G11B 20/10037* (2013.01); *G11B 5/012* (2013.01); *G11B 5/455* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,503,125 | B2 | 8/2013 | Contreras et al. |
| 8,824,249 | B2 | 9/2014 | Erden et al. |
| 9,025,420 | B1 | 5/2015 | Ito et al. |
| 9,153,266 | B1 | 10/2015 | Chia et al. |
| 9,153,272 | B1 | 10/2015 | Rausch et al. |
| 2007/0014197 | A1 | 1/2007 | Verschuren |
| 2012/0275279 | A1 | 11/2012 | Wilson et al. |
| 2015/0043317 | A1 | 2/2015 | Seigler et al. |

OTHER PUBLICATIONS

Wang, Y. et al., "Pulsed Thermally Assisted Magnetic Recording," IEEE Transactions on Magnetics, vol. 49, No. 2, Feb. 2013, pp. 739-743.

*Primary Examiner* — Brian Butcher
(74) *Attorney, Agent, or Firm* — Foley & Lardner LLP

(57) ABSTRACT

A system for compensating for heat induced transient phase shift in a heat assisted magnetic recording system. A heat assisted magnetic data recording system includes a near field thermal transducer that locally heats the media during writing. The thermal transducer, when activated, results in a change in size of a magnetic transition written to the magnetic media. This change in size of the thermal transition results in a transient phase shift of the data recorded on the magnetic media. The system includes circuitry for predetermining an anticipated amount of transient phase shift and adjusting a subsequent read signal to compensate for the known transient phase shift, thereby eliminating signal errors resulting from the transient phase shift.

14 Claims, 5 Drawing Sheets

MITIGATION OF LASER POWER VARIATION INDUCED PHASE SHIFT IN HEAT ASSISTED MAGNETIC RECORDING SYSTEMS

FIELD OF THE INVENTION

The present invention relates to magnetic data recording, and more specifically to a heat assisted magnetic recording (HAMR) system that compensates for transient phase shift resulting from heating of the write head.

BACKGROUND

Modern day information is commonly stored in magnetic disk drives that include a rotating magnetic disk and a slider containing one or more magnetic head assemblies that house read and write heads that are suspended over the disk by a swinging suspension arm. When the disk rotates, air flows underneath the slider and causes it to lift off and 'fly' over the surface of the rotating disk, allowing for the magnetic heads to be employed via processing circuitry to read and write magnetic impressions to and from the rotating disk.

The write head includes at least one coil, a write pole, and one or more return poles. When current flows through the coil, it induces a magnetic field that emanates from the write pole into the disk. The magnetic field is sufficiently strong that it locally magnetizes a portion of the magnetic media, thus allowing for data bits to be recorded onto the disk. After passing through the magnetic layer, the magnetic field travels through the rest of the disk and completes its path by returning to the return pole of the write head.

Once a data bit is recorded onto the disk, its magnetic state can be read with a magnetoresistive sensor, such as giant magnetoresistive (GMR) or a tunnel junction magnetoresistive (TMR) sensor that has a measurable electrical resistance that changes in response to the magnetic field state of the recorded data bit.

This read/write method is the recording technique typically implemented in conventional perpendicular magnetic recording (PMR). However, as data density needs increase and data bits are made smallerand packed closer together, they become thermally unstable and prone to demagnetization. One way to circumvent this problem is to make the recording media more magnetically stiff, i.e. have a higher magnetic anisotropy. However, 'stiffer' media also require higher recording magnetic fields, something which is in itself a limitation since in order to record smaller data bits, the pole size also needs to be reduced, and this in turn reduces the strength of the magnetic field that can be delivered to the disk.

A solution to this challenge is to use heat assisted magnetic recording (HAMR) in which data bits are defined by locally heating the media through the use of a near field thermal transducer (NFT) just at the location on the disk that is to be recorded. The heating process temporarily lowers the magnetic anisotropy of the media, thus 'softening' it and allowing it to be recorded with the pole write fields that would otherwise be too weak to induce magnetization. Then, after the data has been written, as the disk spins past the NFT, the media cools, causing the anisotropy of the media to rise again, thereby ensuring that the media 'freezes in' the magnetic state of the recorded data bit.

SUMMARY

The present nvention presents a magnetic data recording system that includes a magnetic media, an actuator, a slider connected with the actuator for movement adjacent to a surface of the magnetic media and a magnetic head formed on the slider. The magnetic head includes circuitry that is configured to determine an anticipated transient phase shift from at least one previous read pass and use that anticipated transient phase shift to adjust for a transient phase shift in a data signal of a subsequent read pass.

This adjustment of transient phase shift advantageously reduces error resulting from heat induced transient phase shift in a heat assisted magnetic recording system. A heat assisted magnetic data recording system uses a near field thermal transducer to locally heat the magnetic media just at the point of writing a data signal. This heating of the media temporarily reduces the magnetic anisotropy of the media allowing the media to be written to, while also ensuring that the recorded magnetic signal is thermally stable once the media cools.

However, when the near field thermal transducer is initially activated it goes through a transient heating stage until heating reaches a steady state. During this transient heating, the size of the data spot written to the media also changes, resulting in a transient movement of the data transition written to the media. This transient phase shift can result in data signal error. However, by providing circuitry and logic for compensating for this transient phase shift, this signal error can be advantageously avoided.

These and other features and advantages of the invention will become apparent upon reading of the following detailed description of the embodiments taken in conjunction with the figures in which consistent reference numbering is used to indicate similar elements throughout.

BRIEF ESCRIPTION OF THE DRAWINGS

For a fuller understanding of the nature and advantages of this invention, as well as to illustrate the preferred mode of use, reference should be made to the following detailed description, read in conjunction with the accompanying drawings, which for clarity are not drawn to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
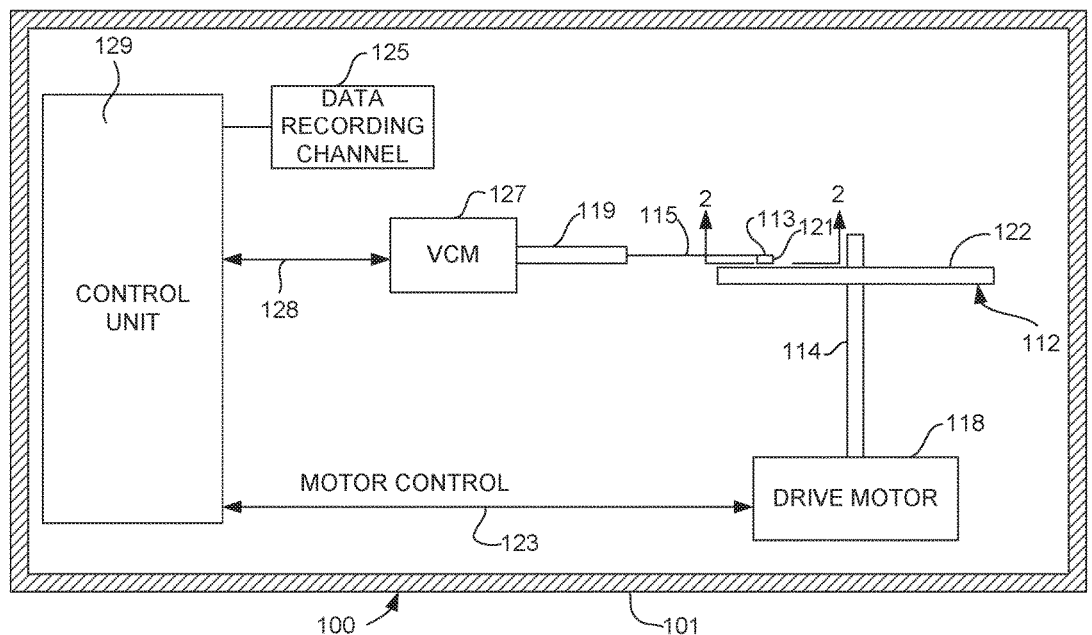
FIG. 1 is a schematic illustration of a disk drive system in which the invention might be embodied.

FIG. 1 shows a disk drive 100 along with its housing 101 containing at least one rotatable magnetic disk 112 that is supported on a spindle 114 and rotated by a disk drive motor 118. The magnetic recording pattern on each disk 112 may be in the form of annular patterns of concentric data tracks (not shown).

At least one slider 113 is positioned near the magnetic disk 112, with each slider 113 supporting one or more magnetic head assemblies 121. As the magnetic disk rotates, the slider 113 moves in and out over the disk surface 122 so that the head assembly 121 can access different tracks on the disk. Each slider 113 is attached to an actuator arm 119 by way of a suspension 115. The suspension 115 provides a slight spring force, which biases the slider 113 against the disk surface 122. Each actuator arm 119 is attached to an actuator means 127, which may be a voice coil motor (VCM) comprised of a coil that is movable according to a magnetic field. The direction and speed of the coil movement is controlled by the motor current signals supplied by the controller 129.

During operation of the disk storage system, the rotation of the magnetic disk 112 generates an air bearing between the slider 113 and the disk surface 122, which exerts an upward force, or lift, on the slider. The air bearing thus counter-balances the slight spring force of the suspension 115 and supports the slider 113 off and slightly above the disk surface by a small, substantially constant spacing during normal operation conditions.

The various components of the disk storage system are controlled by access control and internal clock signals that are generated by a control unit 129, typically comprised of logic control circuits and a microprocessor. An aspect of the control unit 129 will be discussed below in greater detail with reference to FIG. 3. The control unit 129 generates control signals to control various system operations such as drive motor control signals on line 123 and head position and seek control signals on line128. The control signals on line 128 move and position the slider 113 to the desired data track on the media 112. Write and read signals are communicated to and from the write and read. heads 121 by way of a recording channel 125. An aspect of the control unit 125 will be discussed below in greater detail with reference to FIG. 3.

Figure 2:
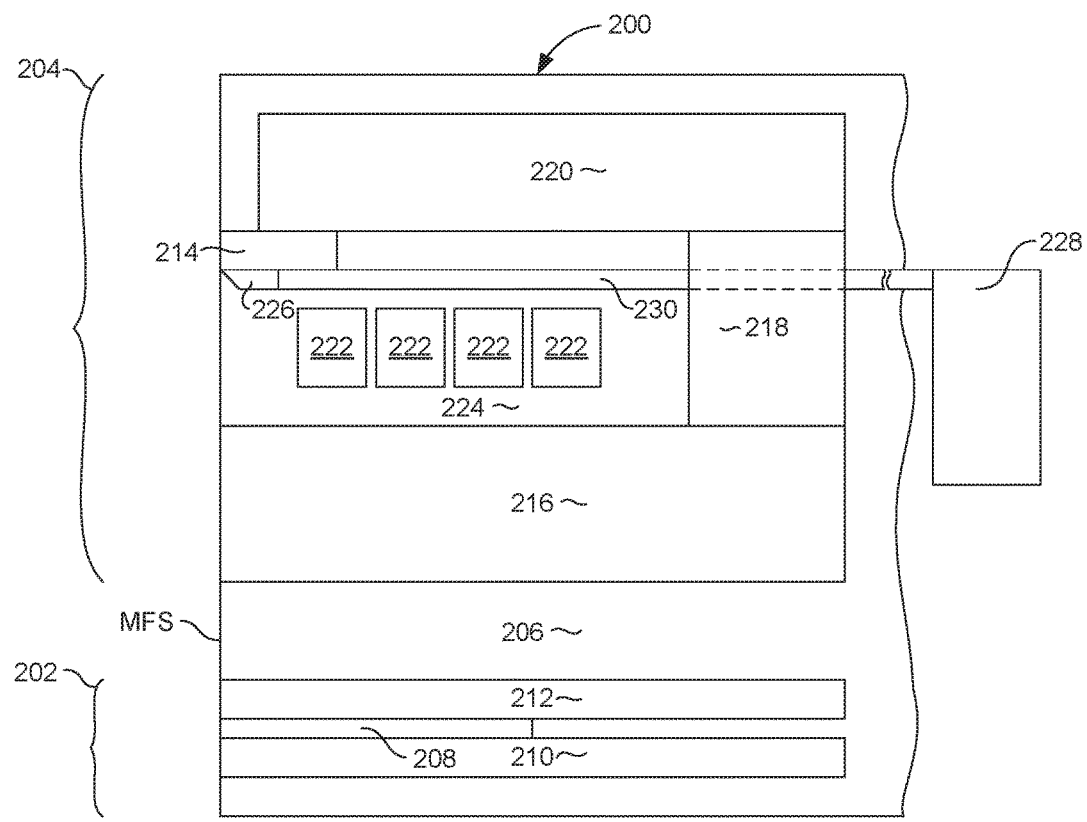
FIG. 2 is a schematic, side, cross-sectional side view of a sample magnetic read/write head used for heat assisted magnetic recording.

FIG. 2 shows a cross sectional side view of a sample magnetic read/write head 200 that incorporates a near field transducer for use in heat assisted magnetic recording. The read/write head 200 includes a magnetic read element 202 and a magnetic write element 204, both of which can be embedded in an insulating fill material 206 such as alumina. The read element includes a magnetoresistive sensor 208 that can be placed in between first and second magnetic shields 210, 212.

The write element 204 includes a magnetic write pole 214, and a magnetic return pole 216, both of which extend out to the media facing surface (MFS) of the head. The write pole 214 is connected to a main pole structure 220 that connects to the return pole 216 via a back gap structure 218.

An electrically conductive, non-magnetic write coil 222, shown in cross section in FIG. 2, passes through the write element 204. The write coil 222 can be constructed of a material such as Cu. The write coil can be embedded in a non-magnetic, electrically insulating layer 224 such as alumina. When an electrical current passes through the write coil 222, a magnetic field is generated that is delivered to the disk via the write pole 214. In conventional perpendicular magnetic recording (PMR), this magnetic field is strong enough to magnetize the media, thus allowing recording to occur. The magnetic field then flows through the rest of the disk, and completes its path by returning to the return pole 216. Because the return pole 216 has a much larger area at the media facing surface MFS than does the write pole 214, the returning magnetic field strength is sufficiently weak that it does not erase any previously recorded data on the disk.

However, as data density needs increase, the size of the write pole is decreased and data bits are made smaller and packed closer together until they become thermally unstable and prone to demagnetization. One way to circumvent this problem is to construct the magnetic media of a higher anisotropy magnetic material. However, while this makes the magnetic media more stable, it also causes it to require higher recording magnetic write fields, a problem that is exacerbated by the fact that smaller write poles output a weaker magnetic field, thus making it difficult for recording to occur.

This challenge can be overcome by the use of heat assisted magnetic recording (HAMR) in which highly anisotropic magnetic media is locally heated to temporarily lower its anisotropy, thus allowing for magnetic recording to occur. Then, as the disk moves past the hotspot, the media cools, and its anisotropy again increases, thus ensuring the magnetic stability of the recorded data on the disk.

To this end, the magnetic write element 204 can include a near field transducer (NFT) 226 that extends to the media facing surface (MFS) at a location adjacent to the leading edge of the write pole 214. The near field transducer is optically connected with a light source, such as a laser 228 that can be located at the backside of the slider on which the magnetic head 200 is formed. The light from the laser 228 can be delivered to the near field transducer via the use of an optical waveguide element 230.

One challenge presented by the use of heat assisted magnetic recording is that the heat from the thermal transducer 226 causes a change in the size of the magnetic write bubble. The term "write bubble" is a term that is used to describe the area on the magnetic media that is magnetized. The heating from the thermal transducer affects the size of the write bubble in that, as the thermal transducer 226 and surrounding structures of the write element 204 heat up, the size of the write bubble increases.

When initiating a write pass, the laser light source 228 is activated so that the near field thermal transducer 226 can heat the media. At first, the write head 204 is at an ambient state. Then, when the thermal transducer 226 is initially activated, the system goes through a transient stage where the write head and media heat up, resulting in a transient movement of the data transition recorded to the media. Eventually, the write head and media enter a steady thermal state d the location of the data transition remains fixed.

To later read back the data that was recorded, the read sensor 208 is connected with processing circuitry 125 (FIG. 1) that processes the magnetic bits recorded to the media and generates a digital signal. One important element of the circuitry 125 is clock circuitry that determines the location and timing of the magnetic bits in a data track direction. In the portionof the written signal at which the write head 204 was in the steady state thermal condition, the location of the write pole 214 and the size of the recorded data spot were not changing, so the clock circuitry has no problem processing the recorded data. However, at the beginning of the write sequence, when the write head is 204 was initially heating up, the location of the magnetic transition recorded to the media was changing. This results in a transient data phase shift in the data track direction. This transient phase shift results in data errors, since the clock circuitry can not accurately calculate the location of those data bits. This problem can be overcome, however, by the implementation of novel processing circuitry that determines the amount of phase shift and adjusts the clock or signal frequency accordingly to accurately process the recorded data.

Figure 3:
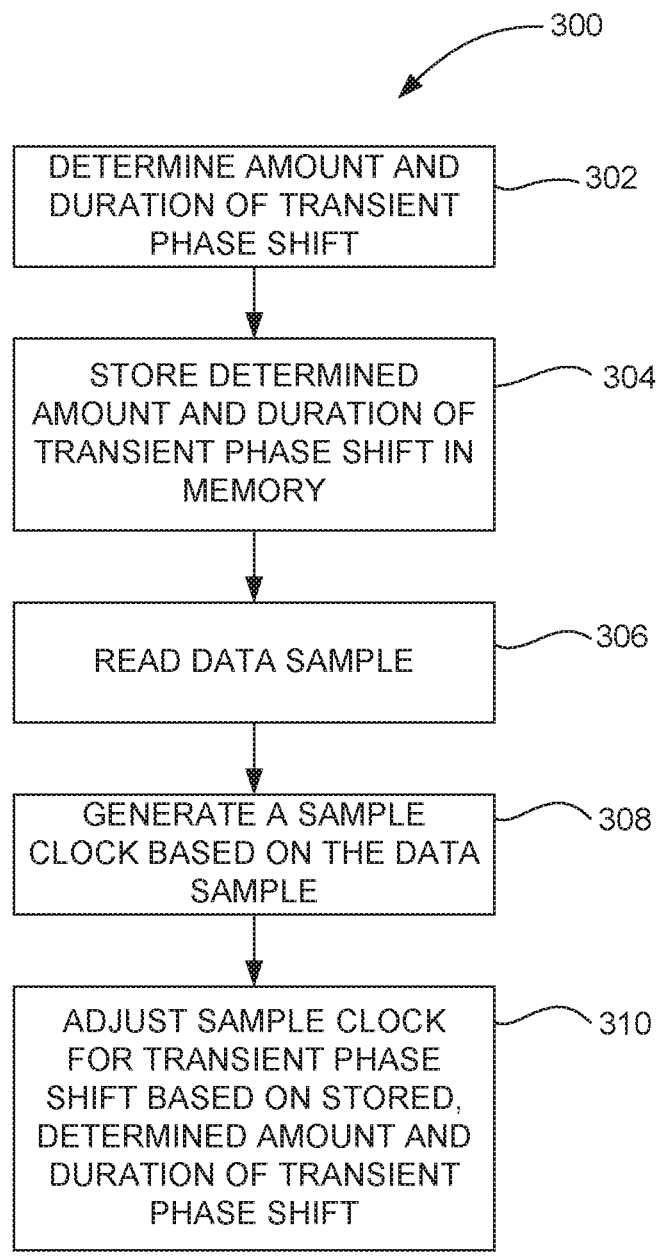
FIG. 3 is a flowchart illustrating a method for compensating for transient phase shift error in a magnetic data recording system.

FIG. 3 is a flowchart that graphically illustrates a process 300 for correcting for transient phase error that results from heating of the write head during a write pass. The process 300 begins with a step 302 of determining the nature of the transient phase shift for a given magnetic head. This nature of the transient phase shift can include the amount and duration of the transient phase shift. Because the structure of the magnetic head and the amount of heating from the near field thermal transducer are substantially the same for any given write pass, the amount of heat induced transient phase shift is substantially repeatable for various write passes. The nature of the transient phase shift can be determined by measuring the transient phase shift of a previous write pass, preferably over several write passes and averaging these measurements to produce an anticipated transient phase shift.

Once the anticipated transient phase shift has been determined, it can be stored in memory for future retrieval (step 304). Thereafter, in a step 306 a data sample is read from a subsequent read pass. Then, in a step 308, a sample clock is generated for the data sample. Then, in a step 310, the sample clock is adjusted for the transient phase shift based on the anticipated transient phase shift which can be retrieved from the memory.

Figure 4:
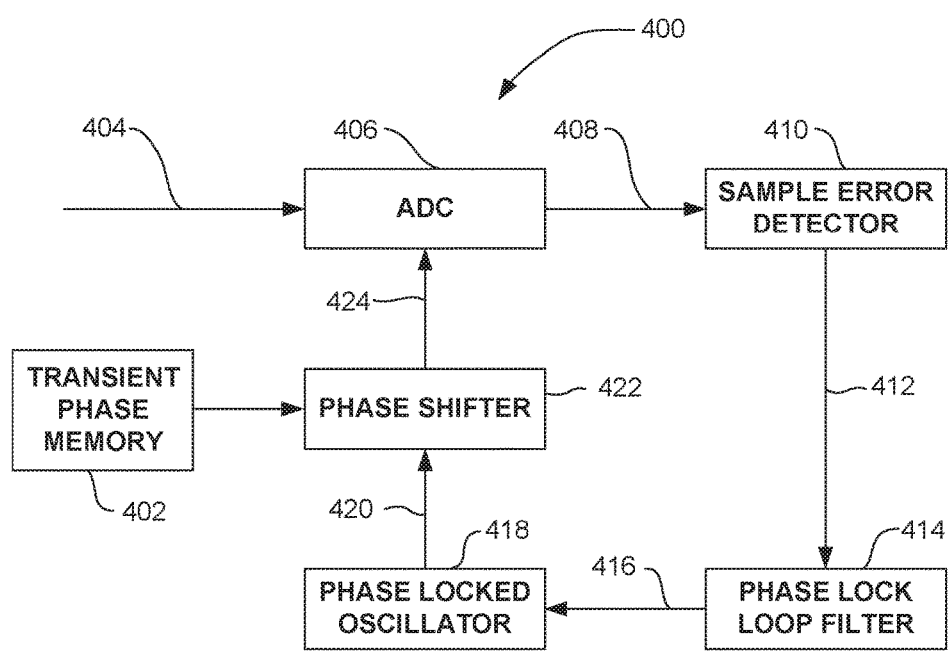
FIG. 4 is a schematic illustration of signal processing circuitry that incorporates transient phase error correction.

There are various ways in which the read signal can be adjusted to compensate for the transient phase shift in the previously recorded data. An example of how this might be accomplished is illustrated with reference to FIG. 4 which shows an example of phase lock loop circuitry 400, which generates a sample clock, as will be described below. As shown in 4 and discussed above with reference to FIG. 3, an anticipated transient phase shift is stored in a memory 402. As discussed above, the anticipated transient phase shift can be determined by averaging measurements of transient phase shifts for several read passes of previously written data.

In order to read data from a magnetic media, a read signal 404 from a read head is input to an analog/digital converter (ADC) 406. The analog/digital converter (ADC) 406 generates a data sample 408 which is sent to a sample error detector 410 which detects clock timing errors. The signal 412 from the sample error detector 410 is passed to a phase lock loop filter 414. The phase lock loop filter 414 then sends a signal 416 to a phase locked oscillator 418 to generate a sample clock 420 which is passed to a to a phase shifter 422, The phase shifter 422 retrieves anticipated transient phase shift data from the memory 402, and uses this data to adjust the sample clock to correct for the transient phase shift. A transient phase shift adjusted sample clock 424 is then passed back to the ADC 406 where signal processing loop repeats. While the above described circuitry provides one example of how a read signal can be processed to account for and compensate for heat induced transient phase shift other possible processing scenarios are possible as well. As one example, the phase shift compensation can be performed based on signal frequency rather than adjustment of clock signal directly.

Figure 5:
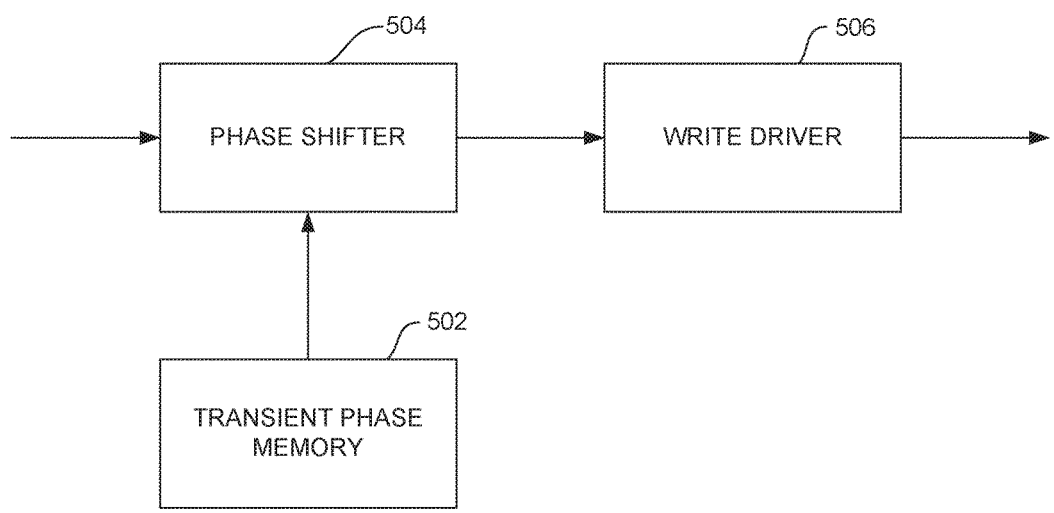
FIG. 5 is a flowchart illustrating an alternate method for compensating for transient phase shift error in a magnetic data recording system.

FIG. 5 is a flowchart illustrating an alternate method for compensating for transient phase shift. With this method, the write signal itself is altered to mitigate the effects of transient phase shift. As discussed above, the nature of the transient phase shift is substantially repeatable and can therefore be determined from previous read and write samples. Once this amount of transient phase shift in at least one previous write sample has been determined it is stored in a transient phase shift memory 502.

A pre-compensated write data signal is input to a phase shifter 504. The previously determined data regarding expected transient phase shift is recalled from the memory 502 and delivered to the phase shifter 504 which applies an opposite phase shift to the write data signal in order to compensate for the transient phase shift. This opposite phase shifted write data signal is then delivered to a write driver 506 which generates a write signal to be delivered to a magnetic write head to record data to a magnetic media.

While various embodiments have been described above, it should be understood that they have been presented by way of example only and are not meant to limit the inventive concepts claimed herein. Other embodiments falling within the breath and scope of the invention may also become apparent to those skilled in the art and thus, the breadth and scope of the invention should not be limited by any of the aforementioned exemplary embodiments, but should be defined only in accordance with the following claims and their equivalents.

What is claimed is:

1. A magnetic data recording system, comprising:
 a magnetic media;
 an actuator;
 a slider connected with the actuator for movement adjacent to a surface of the magnetic media;
 a magnetic head formed on the slider, the magnetic head including a read element and a write element; and
 circuitry configured to determine an anticipated transient phase shift and use the anticipated transient phase shift to compensate for a current transient phase shift;
 wherein the magnetic data recording system is a heat assisted magnetic recording system and wherein the write element of the magnetic head further comprises a near field thermal transducer; and
 wherein the transient phase shift results from heating of the near field thermal transducer.

2. A magnetic data recording system, comprising:
 a magnetic media;
 an actuator;
 a slider connected with the actuator for movement adjacent to a surface of the magnetic media;
 a magnetic head formed on the slider, the magnetic head including a read element and a write element; and
 circuitry configured to determine an anticipated transient phase shift and use the anticipated transient phase shift to compensate for a current transient phase shift;
 wherein the compensating for the current transient phase shift comprises adjusting a clock frequency.

3. The magnetic data recording system as in claim 1 wherein the circuitry comprises a phase lock loop.

4. The magnetic data recording system as in claim 1, wherein the circuitry is further configured to adjust a write signal to compensate for the current transient phase shift.

5. The magnetic data recording system as in claim 1, wherein the circuitry comprises:
 a memory for storing the anticipated transient phase shift; and
 a phase shifter for retrieving the anticipated transient phase shift from the memory and adjusting a phase of a write signal to compensate for the anticipated transient phase shift.

6. A method for compensating for heat induced transient phase shift in a magnetic data recording system, comprising:
 determining an anticipated transient phase shift from at least one previous read pass;
 storing the anticipated transient phase shift;

performing a subsequent data write to generate a data signal, the data signal having a current transient phase shift; and compensating for the current transient phase shift based on the stored anticipated transient phase shift;

wherein the anticipated transient phase shift and current transient phase shift both result from thermal heating.

7. The method as in claim 6, wherein the compensating for the current transient phase shift comprises adjusting a sample clock phase.

8. The method as in claim 6, wherein the compensating for the current transient phase shift comprises adjusting a clock frequency.

9. The method as in claim 6, wherein the method is embodied in circuitry residing in a magnetic data recording system.

10. The method as in claim 6, wherein the method is embodied in circuitry of a heat assisted magnetic recording system and wherein the anticipated transient phase shift and current transient phase shift result from heating from a near field thermal transducer formed within a magnetic write element of the magnetic data recording system.

11. A method for compensating for heat induced transient phase shift in a magnetic data recording system, comprising:

determining an anticipated transient phase shift from at least one previous read pass;

storing the anticipated transient phase shift;

performing a subsequent data write to generate a data signal, the data signal having a current transient phase shift; and compensating for the current transient phase shift based on the stored anticipated transient phase shift;

wherein the determination of the anticipated transient phase shift comprises: reading signals from multiple previous read passes;

calculating a transient phase shift for each of the multiple previous read passes; and calculating an average transient phase shift from each of the transient phase shifts of the multiple previous read passes.

12. The method as in claim 6, wherein the compensating for the current transient phase shift further comprises adjusting a phase of a write signal.

13. The method as in claim 6, wherein the compensating for the current transient phase shift further comprises retrieving the anticipated transient phase shift, and adjusting a phase of a current write signal based on the retrieved anticipated transient phase shift.

14. The method as in claim 13, wherein the phase of the transient phase shift is adjusted in a manner opposite to the anticipated transient phase shift.

* * * * *